United States Patent
Ueda

(10) Patent No.: US 10,026,559 B2
(45) Date of Patent: Jul. 17, 2018

(54) ELECTROLYTIC CAPACITOR AND MANUFACTURING METHOD FOR SAME

(71) Applicant: Panasonic Intellectual Property Management Co., Ltd., Osaka (JP)

(72) Inventor: Masahiro Ueda, Saga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 15 days.

(21) Appl. No.: 15/088,274

(22) Filed: Apr. 1, 2016

(65) Prior Publication Data

US 2016/0217933 A1 Jul. 28, 2016

Related U.S. Application Data

(63) Continuation of application No. PCT/JP2014/005808, filed on Nov. 19, 2014.

(30) Foreign Application Priority Data

Nov. 20, 2013 (JP) .................................. 2013-240288

(51) Int. Cl.
| | |
|---|---|
| *H01G 9/00* | (2006.01) |
| *H01G 9/07* | (2006.01) |
| *H01G 9/025* | (2006.01) |
| *H01G 9/028* | (2006.01) |
| *H01G 9/15* | (2006.01) |

(52) U.S. Cl.
CPC .......... *H01G 9/025* (2013.01); *H01G 9/0032* (2013.01); *H01G 9/0036* (2013.01); *H01G 9/028* (2013.01); *H01G 9/15* (2013.01)

(58) Field of Classification Search
CPC ........................................................ H01G 9/07
See application file for complete search history.

(56) References Cited

U.S. PATENT DOCUMENTS

| | | | | |
|---|---|---|---|---|
| 5,124,022 A | * | 6/1992 | Evans, II | ................. C25D 9/02 148/241 |
| 2009/0268378 A1 | * | 10/2009 | Matsuura | ................. H01G 9/02 361/524 |

FOREIGN PATENT DOCUMENTS

| | | | |
|---|---|---|---|
| JP | 5-074663 | 3/1993 | |
| JP | 10-079326 | 3/1998 | |
| JP | 2000-164472 | 6/2000 | |
| JP | 2003-338432 | 11/2003 | |
| JP | 2006287182 A | * 10/2006 | ............. H01G 11/48 |
| JP | 2010-174339 | 8/2010 | |

OTHER PUBLICATIONS

International Search Report of PCT application No. PCT/JP2014/005808 dated Feb. 24, 2015.

* cited by examiner

*Primary Examiner* — Eric Thomas
(74) *Attorney, Agent, or Firm* — McDermott Will & Emery LLP

(57) ABSTRACT

An electrolytic capacitor includes an anode body, a dielectric layer disposed on the anode body, and a cathode body. An organic polymer attached to the dielectric layer is disposed between the dielectric layer and the cathode body. The organic polymer has one or more groups selected from an acidic group and residues of the acidic group, and at least one of the one or more groups is incorporated into the dielectric layer.

9 Claims, 2 Drawing Sheets

ELECTROLYTIC CAPACITOR AND MANUFACTURING METHOD FOR SAME

BACKGROUND

1. Technical Field

The present disclosure relates to an electrolytic capacitor including a dielectric layer formed by anodization and a manufacturing method therefor.

2. Background Art

Recently, a small-sized and large-capacity capacitor for high frequency has been required according to a reduction in size and a reduction in weight of electronic devices. An electrolytic capacitor having small equivalent series resistance (ESR) and excellent frequency properties has been developed as such a capacitor. The electrolytic capacitor includes an anode body containing valve action metal such as tantalum, niobium, titanium, and aluminum, a dielectric layer formed on the anode body, and a cathode body. Among electrolytic capacitors, the electrolytic capacitor in which a solid electrolyte layer (hereinafter, simply referred to as a conductive polymer layer) containing a conductive polymer is formed on the dielectric layer as the cathode body is referred to as a solid electrolytic capacitor.

The dielectric layer is formed by performing a chemical conversion treatment (that is, anodization) to a part of the anode body. The chemical conversion treatment of the related art is performed by dipping the anode body into a chemical conversion liquid, such as an aqueous solution of phosphoric acid, and by applying a current between a cathode electrode and the anode body (an anode electrode) (for example, refer to Japanese Patent Unexamined Publication No. 2000-164472 and Japanese Patent Unexamined Publication No. 2003-338432).

SUMMARY

An object of the present disclosure is to suppress a leak current in an electrolytic capacitor including a dielectric layer.

An electrolytic capacitor according to one aspect of the present disclosure includes an anode body, a dielectric layer disposed on the anode body, and a cathode body opposing the anode body via the dielectric layer. An organic polymer attached to the dielectric layer is disposed between the dielectric layer and the cathode body. The organic polymer has one or more groups selected from an acidic group and residues of the acidic group, and at least one of the one or more groups is incorporated into the dielectric layer.

In a manufacturing method of an electrolytic capacitor according to one aspect of the present disclosure, first, an anode body is prepared. Next, a dielectric layer is formed on the anode body. Then, a cathode body is disposed such that the cathode body opposes the anode body via the dielectric layer. The anode body is anodized by bringing the anode body into contact with a first treatment liquid containing an organic polymer having one or more acidic groups at a time of forming the dielectric layer.

According to the present disclosure, it is possible to provide an electrolytic capacitor in which a leak current of a dielectric layer is suppressed.

DETAILED DESCRIPTION OF PREFERRED EMBODIMENT

Figure 1:
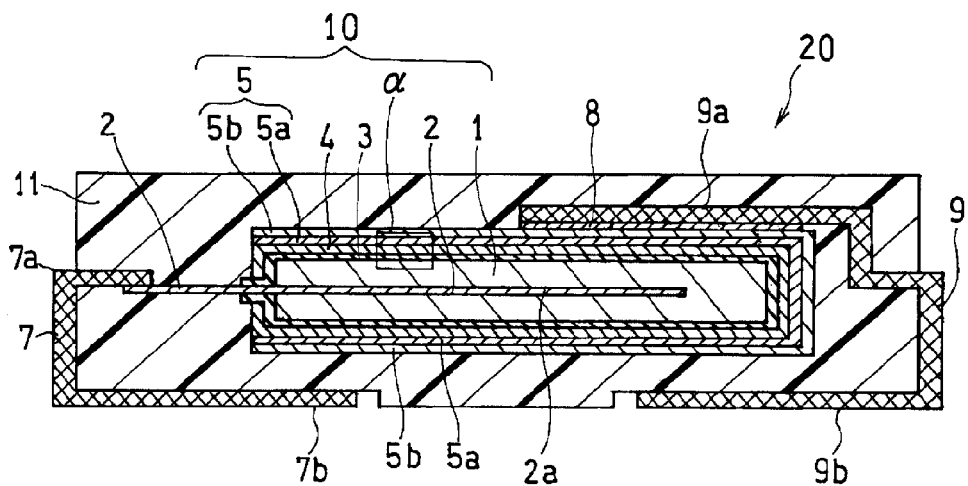
FIG. 1 is a sectional schematic view of an electrolytic capacitor according to an embodiment of the present disclosure.

Prior to describing embodiments of the present disclosure, problems of the electrolytic capacitor of the related art will be simply described. In a chemical conversion treatment of the related art, a chemical conversion liquid containing a low molecular compound such as phosphoric acid is used as an electrolyte, as disclosed in Japanese Patent Unexamined Publication No. 2000-164472 and Japanese Patent Unexamined Publication No. 2003-338432. However, in a case where an anode body is subjected to a treatment by the chemical conversion liquid containing the low molecular compound, film quality of a dielectric layer to be formed (for example, denseness of a film) may be not sufficient, and a leak current of the electrolytic capacitor may increase.

An electrolytic capacitor of the present disclosure includes an anode body, a dielectric layer disposed on the anode body, and a cathode body opposing the anode body via the dielectric layer. An organic polymer attached to the dielectric layer exists between the dielectric layer and the cathode body. The organic polymer has one or more groups (hereinafter, referred to as an acidic functional group) selected from an acidic group and residues of the acidic group. In addition, at least one of the one or more acidic functional groups is incorporated into the dielectric layer. Since the acidic functional group of the organic polymer is incorporated into the dielectric layer, adhesiveness between the organic polymer and the dielectric layer increases.

In the electrolytic capacitor described above, the organic polymer is attached to the dielectric layer with high adhesiveness, and thus, a defect such as a crack rarely occurs in the dielectric layer, and an increase in a leak current is suppressed. In addition, the dielectric layer easily becomes dense.

Further, in a case where the cathode body includes a conductive polymer layer formed on the dielectric layer, adhesiveness between the dielectric layer and the conductive polymer layer is improved according to the presence of the organic polymer. Therefore, an effect of suppressing a leak current is increased.

The organic polymer may have one acidic functional group per repeating unit derived from a monomer, or a part of the repeating units arranged by polymerization may have an acidic functional group. The organic polymer may have a plurality of types of different acidic groups, or may have residues of a plurality of types of different acidic groups. In addition, the organic polymer may be a copolymer. In this case, among two or more types of different monomers, only one type of monomer may have an acidic functional group, or all or a part of a plurality of types of different monomers may have an acidic group.

The residues of the acidic group are formed by a reaction of the acidic group. The reaction of the acidic group, for example, may be a reaction between an acidic group and constituents of the dielectric layer or constituents of the cathode body (for example, the conductive polymer layer). For example, in a case where the acidic group is a phosphorus-containing oxo acid group (for example, a phosphonic acid group), the residues of the acidic group contains phosphorus. In a case where the acidic group is a sulfur-containing oxo acid group (for example, a sulfonic acid group), the residues of the acidic group contains sulfur. In a case where the acidic group is a carbon-containing oxo acid group (a carboxylic acid group), the residues of the acidic group contains carbon. The organic polymer having such an acidic group is suitable as a component of a chemical conversion liquid used for anodization and is easily incorporated into the inside of the dielectric layer.

The number of acidic functional groups which are incorporated into the inside of the dielectric layer may be equal to or greater than one per one molecule of the organic polymer. That is, it is not necessary that all of the acidic functional groups are incorporated into the inside of the dielectric layer. However, the total amount of acidic functional group incorporated into the inside of the dielectric layer is preferably equal to or greater than 1%, and is more preferably equal to or greater than 5%, per one molecule of the organic polymer. Thereby, the adhesiveness between the organic polymer and the dielectric layer increases.

The organic polymer, for example, has a main chain and a side chain. The main chain is preferably a polyalkylene main chain. In this case, the side chain includes an acidic functional group. The acidic functional group bonded to the polyalkylene main chain is easily incorporated into the inside of the dielectric layer, and the organic polymer easily covers at least a part of the surface of the dielectric layer.

In a manufacturing method of an electrolytic capacitor of the present disclosure, first, the anode body is prepared. Next, the dielectric layer is formed on the anode body. Then, the cathode body is arranged such that the cathode body opposes the anode body via the dielectric layer. The anode body is anodized by bringing the anode body into contact with a first treatment liquid containing an organic polymer having one or more acidic groups at the time of forming the dielectric layer (Step A). Furthermore, when the cathode body is arranged such that the cathode body opposes the anode body via the dielectric layer, for example, the conductive polymer layer is formed on the dielectric layer.

According to the method described above, the dielectric layer formed by anodization easily becomes dense. In addition, at least a part of the acidic functional group is easily incorporated into the inside of the dielectric layer, and the organic polymer is easily attached onto the surface of the dielectric layer. In addition, it is difficult for the organic polymer (or the chemical conversion liquid containing the organic polymer) to penetrate into the inside of the anode body, compared to an inorganic acid and a low molecular carboxylic acid. Therefore, excessive oxidation of the anode body is suppressed. Accordingly, the dielectric layer is easily formed to be thin, and electrostatic capacitance easily increases. An electrolytic capacitor having excellent voltage resistance and high electrostatic capacitance can be obtained by forming a dense and thin dielectric layer.

In addition, the organic polymer (or the chemical conversion liquid containing the organic polymer) preferentially acts on a surface layer portion of the anode body, and thus, the thickness of the dielectric layer tends to increase towards the surface layer of the anode body. Accordingly, the dielectric layer can be made easily to be denser and thicker as being closer to the surface layer of the anode body on which a defect easily occurs due to external factors. Please note that the surface of the anode body in a macro view is referred to the surface layer.

In contrast, an inorganic acid (for example, phosphoric acid) and a low molecular carboxylic acid (for example, acetic acid) are low molecular compounds, and thus, the inorganic acid and the low molecular carboxylic acid easily penetrate into the inside of the anode body, and the anode body may be excessively oxidized. Accordingly, a thick dielectric layer tends to be formed into the inside of the anode body, and thus, it is difficult to improve electrostatic capacitance. In addition, in a case of using the inorganic acid or the low molecular carboxylic acid, the dielectric layer is less likely to be dense, compared to a case of using the organic polymer having an acidic group.

Furthermore, the low molecular carboxylic acid, for example, indicates a carboxylic acid having a molecular weight of less than 1,000. In contrast, the weight average molecular weight of the organic polymer having an acidic group is equal to or greater than 1,000.

In addition to Step A described above, the anode body can also be anodized by bringing the anode body into contact with a second treatment liquid containing at least one selected from an inorganic acid and a low molecular carboxylic acid at the time of forming the dielectric layer (Step B). Accordingly, the effect of suppressing the leak current is increased. In addition, it is possible to further improve the film quality of the dielectric layer.

Step A using the first treatment liquid is performed after Step B using the second treatment liquid. Thereby, the dielectric layer on the surface layer region of the anode body to which stress is easily applied from the outside selectively easily becomes thick and dense. Accordingly, it is possible to increase the effect of suppressing the leak current while ensuring electrostatic capacitance. In addition, on the surface layer region of the anode body to which stress is easily applied from the outside, the dielectric layer can be preferentially covered with the organic polymer.

The viscosity of the first treatment liquid is preferably in arrange from 0.05 Pa·s to 10 Pa·s, inclusive, at 25° C. Accordingly, excessive oxidization of the anode body is easily suppressed.

The first treatment liquid or the second treatment liquid gradually penetrates into the inside of the anode body from the surface layer region. Accordingly, the surface layer region of the anode body indicates a region of the anode body which is initially in contact with the treatment liquid at the time of being dipped into the first treatment liquid or the second treatment liquid. That is, the surface layer region of the anode body indicates a region close to the apparent surface of the anode body. On the other hand, the inside of the anode body indicates a region (for example, a deep portion of a fine pore of the anode body) separated from the apparent surface of the anode body.

Hereinafter, embodiments of the present disclosure will be described in detail with reference to the drawings.

First Exemplary Embodiment

Figure 2:
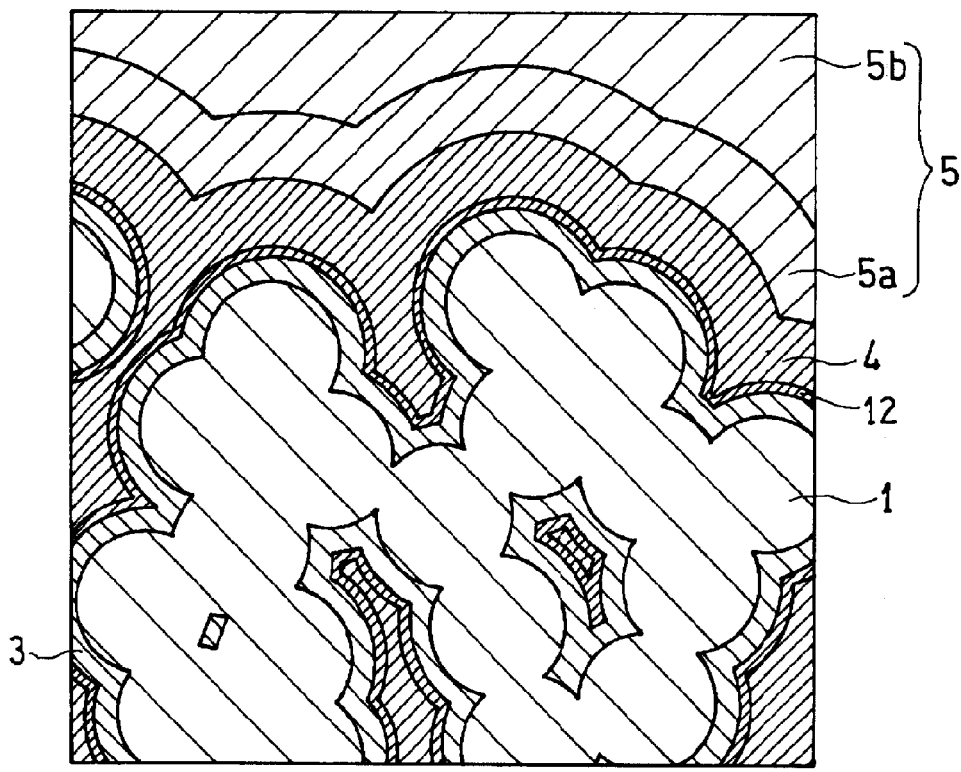
FIG. 2 is an enlarged sectional schematic view illustrating a region surrounded by solid line α of FIG. 1.

FIG. 1 is a sectional schematic view of electrolytic capacitor 20 according to this embodiment. FIG. 2 is an enlarged view of a region surrounded by solid line α of FIG. 1. Electrolytic capacitor 20 includes capacitor element 10 having an outer shape of an approximately rectangular parallelepiped, resin exterior body 11 sealing capacitor element 10, and anode terminal 7 and cathode terminal 9 which are partially exposed to the outside of resin exterior body 11. Electrolytic capacitor 20 has an outer shape of an approximately rectangular parallelepiped, like capacitor element 10.

Capacitor element 10 includes anode body 1 having a shape of an approximately rectangular parallelepiped, anode lead 2 having first end portion 2a embedded in anode body 1 and second end portion 2b drawn out from anode body 1, dielectric layer 3 covering the surface of anode body 1, and a cathode body opposing anode body 1 via dielectric layer 3. The cathode body includes electrolyte layer 4 and cathode layer 5 covering the surface of electrolyte layer 4.

A conductive inorganic material such as manganese dioxide, a conductive organic material such as tetracyano-quinodimethane (TCNQ) complex salt, or a conductive polymer is employed as an electrolyte material configuring electrolyte layer 4. Note that the electrolyte material is not limited to the conductive inorganic material or the conductive organic material, and various substances can be used as the electrolyte material. In the following embodiment, however, a case of forming conductive polymer layer 4 of a conductive polymer as electrolyte layer 4 will be exemplarily described.

Cathode layer 5 of an illustrated example has a two-layer structure, and includes carbon layer 5a in contact with conductive polymer layer 4, and silver paste layer 5b covering the surface of carbon layer 5a. Furthermore, the configuration of the cathode body is not limited thereto, and it is enough that the cathode body may have a configuration providing a current collecting function.

Second end portion 2b of anode lead 2 is electrically connected, by welding or the like, to first end portion 7a of anode terminal 7 which is sealed with resin exterior body 11. On the other hand, cathode layer 5 is electrically connected to first end portion 9a of cathode terminal 9 which is sealed with resin exterior body 11, via conductive adhesive material 8 (for example, a mixture of a thermosetting resin and metal particles). Second end portion 7b of anode terminal 7 and second end portion 9b of cathode terminal 9 are respectively drawn out from different side surfaces of resin exterior body 11, and extend up to one main flat surface (in FIG. 1, a lower surface) in an exposed state. An exposed portion of each terminal on the flat surface is used for solder connection or the like with respect to a circuit board (not illustrated) on which solid electrolytic capacitor 20 is to be mounted.

Anode body 1 is formed of a porous body having conductivity. Anode lead 2, for example, is formed of a wire having conductivity. Anode body 1, for example, is prepared by embedding first end portion 2a of anode lead 2 in particles of a valve action metal or an alloy containing the valve action metal, then molding the metal particles into the shape of a rectangular parallelepiped in this state, followed by sintering the molded body. That is, anode body 1 is a bonded body (a sintered body) of the particles of the valve action metal or the alloy containing the valve action metal. Accordingly, second end portion 2b of anode lead 2 is drawn out from the outer circumferential surface of anode body 1 to be implanted. In this embodiment, anode body 1 is a porous body of the particles of the valve action metal.

The same types or different types of materials are used as a conductive material configuring anode body 1 and anode lead 2. As the conductive material, titanium (Ti), tantalum (Ta), aluminum (Al), niobium (Nb), and the like which are valve action metals are used. The metals have high dielectric constant as well oxides thereof, and are suitable as a configuration material of anode body 1. Furthermore, the conductive material may be an alloy formed of two or more types of metals. For example, it is possible to use an alloy containing the valve action metal, silicon, vanadium, boron, and the like. Alternatively, a compound containing the valve action metal and a typical element, such as nitrogen, may be used.

Furthermore, in this embodiment, the alloy of the valve action metal contains the valve action metal as a main component, and it is preferable that the amount of valve action metal is equal to or greater than 50 atom %. In addition, anode body 1 and anode lead 2 may be formed of conductive materials which are different from each other.

Dielectric layer 3 is formed on the surface of the conductive material configuring anode body 1. Specifically, dielectric layer 3 can be formed by anodizing the surface of the conductive material configuring anode body 1. Accordingly, as illustrated in FIG. 2, dielectric layer 3 is formed along the surface (including the inner wall surface of the fine pore) of the porous body configuring anode body 1.

An organic polymer having one or more groups (an acidic functional group) selected from an acidic group and residues of the acidic group is attached on the surface of dielectric layer 3. For example, as illustrated in FIG. 1, a layer containing the organic polymer having an acidic functional group (hereinafter, organic polymer layer 12) is formed on the surface of dielectric layer 3. In addition, at least one of the acidic functional groups is incorporated into the inside of dielectric layer 3. The concentration of the acidic functional group contained in dielectric layer 3 tends to increase as being closer to the surface layer of dielectric layer 3.

Meanwhile, organic polymer layer 12 may cover at least a part of the surface of dielectric layer 3, and it is not necessary to cover the entire surface of dielectric layer 3.

It is possible to examine that at least one acidic functional group is incorporated into dielectric layer 3, for example, by analyzing the composition of dielectric layer 3 using a time-of-flight secondary ion mass spectrograph (TOF-SIMS).

Conductive polymer layer 4 as the cathode body is so formed as to cover the surface of organic polymer layer 12. In addition, in a case where dielectric layer 3 is exposed from organic polymer layer 12, conductive polymer 4 is also formed on the exposed surface of dielectric layer 3. Conductive polymer layer 4 may be a single layer, or may be formed of a plurality of layers containing the same types or different types of conductive polymers.

Examples of the conductive polymer forming conductive polymer layer 4 include polypyrrole, polythiophene, polyfuran, polyaniline, polyacetylene, polyphenylene, polyphenylene vinylene, polyacene, polythiophene vinylene, and the like. One type of the conductive polymers may be independently used, two or more types thereof may be used in combination, or a copolymer of two or more types of monomers may be used.

Furthermore, herein, polypyrrole, polythiophene, polyfuran, polyaniline, and the like stand for polymers each having a basic framework of polypyrrole, polythiophene, polyfuran, polyaniline, and the like, respectively. Therefore, polypyrrole, polythiophene, polyfuran, polyaniline, and the like also include derivatives, respectively. For example, polythiophene includes poly(3,4-ethylene dioxy thiophene) and the like.

Cathode layer 5 is so formed as to cover the surface of conductive polymer layer 4. Specifically, cathode layer 5 includes carbon layer 5a formed on the surface of conductive polymer layer 4, and silver paste layer 5b formed on the surface of carbon layer 5a.

In the configuration as described above, anode body 1 and anode lead 2 are anode members of capacitor element 10. In addition, conductive polymer layer 4 and cathode layer 5 are cathode members of capacitor element 10. Dielectric layer 3 is a dielectric member of capacitor element 10.

Next, a configuration between dielectric layer 3 and conductive polymer layer 4 will be described in more detail.

The organic polymer (organic polymer layer 12) having a plurality of acidic functional groups is attached between dielectric layer 3 and conductive polymer layer 4. A part of the acidic functional groups is incorporated into the inside of dielectric layer 3.

For example, in a case where the acidic group is a phosphorus-containing oxo acid group (for example, a phosphonic acid group), the phosphorus-containing oxo acid group or the residues thereof are incorporated into dielectric layer 3. Accordingly, dielectric layer 3 contains phosphorus in the inside (in particular, in the vicinity of conductive polymer layer 4). In a case where the acidic group is a sulfur-containing oxo acid group (for example, a sulfonic acid group), the sulfur-containing oxo acid group or the residues thereof are incorporated into dielectric layer 3. Accordingly, dielectric layer 3 contains sulfur in the inside (in particular, in the vicinity of conductive polymer layer 4). In a case where the acidic group is a carbon-containing oxo acid group (a carboxylic acid group), the carbon-containing oxo acid group or the residues thereof are incorporated into dielectric layer 3. Accordingly, dielectric layer 3 contains carbon in the inside (in particular, in the vicinity of conductive polymer layer 4). Accordingly, the following effects are obtained.

First, since the organic polymer is attached to dielectric layer 3, a defect such as a crack rarely occurs in dielectric layer 3, and an increase in a leak current is suppressed. This effect increases as adhesiveness between dielectric layer 3 and the organic polymer becomes higher. In general, the organic polymer has plurality of acidic functional groups, and a part of the plurality of acidic functional groups is incorporated into the inside of dielectric layer 3. Accordingly, the adhesiveness between the organic polymer and the dielectric layer is sufficiently ensured.

Second, the dielectric layer easily becomes dense. This is because the organic polymer is involved in a formation process of dielectric layer 3. As a result thereof, the increase in the leak current is further suppressed.

Third, adhesiveness between dielectric layer 3 and conductive polymer layer 4 is improved according to the presence of organic polymer layer 12. As a result, an effect of suppressing the leak current further is increased. This is because affinity between organic polymer layer 12 and the polymer configuring conductive polymer layer 4 is high. This effect also increases as the acidic functional group is incorporated into the inside of the dielectric layer and adhesiveness between organic polymer layer 12 and dielectric layer 3 becomes higher.

Examples of the phosphorus-containing oxo acid group include a phosphoric acid group, a phosphorous acid group, a phosphonic acid group, and the like. Examples of the sulfur-containing oxo acid group include a sulfonic acid group. Examples of the carbon-containing oxo acid group include a carboxylic acid group. One type of the acid groups may be independently included in the organic polymer, or a plurality of types thereof may be included in the organic polymer. Among them, the phosphonic acid group is particularly suitable for forming a dense dielectric layer.

Next, a manufacturing method of an electrolytic capacitor will be described in more detail.

Hereinafter, a step of preparing anode body 1, a step of forming dielectric layer 3 on anode body 1, a step of forming the cathode body (conductive polymer layer 4) opposing anode body 1 via dielectric layer 3, and a step of forming cathode layer 5 will be sequentially described.

(1) Step of Forming Anode Body 1

Anode body 1 formed of a porous sintered body as illustrated in FIG. 2 is prepared by embedding first end portion 2a of anode lead 2 in the particles of the valve action metal, and molding the metal particles into the shape of a rectangular parallelepiped in this state, followed by sintering the molded body.

(2) Step of Forming Dielectric Layer 3

A step of forming dielectric layer 3 includes Step A of anodizing anode body 1 by bringing anode body 1 into contact with the first treatment liquid containing the organic polymer having an acidic group.

In Step A, anode body 1 is dipped into a chemical conversion tank which is filled with the first treatment liquid, and anode lead 2 is connected to an anode of the chemical conversion tank. At this time, the first treatment liquid penetrates into a gap between the particles of the valve action metal configuring anode body 1 which is a porous body. Next, a current is allowed to flow between a cathode of the chemical conversion tank and anode body 1 (an anode electrode), and dielectric layer 3 is formed by anodization on the surface of anode body 1 (the surface of a pore of the porous body configuring anode body 1).

(First Treatment Liquid)

It is preferable that the first treatment liquid is an aqueous solution containing the organic polymer having an acid group as an electrolyte. The concentration of the organic polymer contained in the first treatment liquid, for example, is 0.01 mass % to 60 mass %, and is preferably 1 mass % to 30 mass %. By controlling the concentration of the organic polymer, it is possible to control the viscosity of the first treatment liquid to be a desired viscosity. Since the organic polymer has an acidic group, the first treatment liquid exhibits acidity. It is preferable that the pH of the first treatment liquid is greater than 0 and equal to or less than 5, from the viewpoint of performing suitable chemical conversion.

It is preferable that the organic polymer is water soluble. By using a water soluble organic polymer, it is possible to obtain the first treatment liquid of an aqueous solution. Here, it is not necessary that a solvent of the first treatment liquid is limited to water, but the solvent may include an organic solvent.

It is preferable that the viscosity of the first treatment liquid is in a range from 0.05 Pa·s to 10 Pa·s, inclusive, at 25° C. The organic polymer having an acidic group preferentially acts on the surface layer region of the anode body as the viscosity becomes higher. In addition, the organic polymer having an acidic group acts, even on the fine pores in the inside of the anode body, as the viscosity becomes lower. Accordingly, by controlling the viscosity of the first treatment liquid, it is possible to obtain a desired distribution of the thickness of dielectric layer 3. For example, dielectric layer 3 can be thicker only on the surface layer region of anode body 1 as the viscosity of the first treatment liquid is made higher.

The organic polymer having an acidic group, for example, has a polyalkylene main chain, and a side chain including an acidic group. The polyalkylene main chain is formed by polymerizing a monomer having a vinyl group. A representative of the organic polymer having a polyalkylene main chain is a polyvinyl compound. Examples of the polyvinyl compound include polyacrylate, polymethacrylate, poly(methyl acrylate), poly(methyl methacrylate), polystyrene, polyvinyl alcohol, polyvinyl pyrrolidone. Among them, an aliphatic polyvinyl compound which does not have an aromatic ring is preferable as the organic polymer having an acidic group. Here, the polyvinyl compound further has a side chain, and the side chain includes an acidic group.

For example, the aliphatic polyvinyl compound which does not have an aromatic ring can be denoted by General Formula (1):

Here, each of blocks denoted by A and B independently represents a group having an ethylene group as a main chain. A does not have an acidic group, but B has an acidic group. A and B are bonded to each other in regular or random arrangement. "n" and "m" are independent from each other, "n" represents an arbitrary integer equal to or greater than 0, and "m" represents an arbitrary integer equal to or greater than 1. Both terminals are not particularly limited, and for example, represent hydrogen atoms.

As described above, the acidic group is a phosphonic acid group, a sulfonic acid group, a carboxylic acid group, or the like. Among them, in a case where the acidic group is a phosphonic acid group, the effect of improving the film quality of dielectric layer 3 is increased, and the effect of reducing a leak current of an electrolytic capacitor is increased. Furthermore, one molecule of the organic polymer may have a plurality of types of acidic groups. In addition, a plurality of types of organic polymers having different acidic groups may be used in combination.

The phosphonic acid group is denoted by General Formula (2):

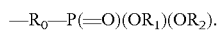

$R_0$ represents a hydrocarbon group of a main chain or a side chain, and each of $R_1$ and $R_2$ independently represents a hydrogen atom or a hydrocarbon group having 1 to 6 (preferably 1 to 3) carbon atoms, for example, a methyl group, an ethyl group, and the like.

The weight-average molecular weight of the organic polymer having an acidic group is preferably equal to or greater than 1000, and is more preferably in a range from 10,000 to 1,000,000. By using the organic polymer having such a molecular weight, the organic polymer easily penetrates into at least a surface layer region of the anode body, and a dense dielectric layer is easily formed. In addition, the organic polymer penetrates into the inside of the anode body.

The number of acidic groups included in one molecule of the organic polymer is not particularly limited, but the organic polymer may have one acidic group per repeating unit derived from a monomer, and a part of the repeating unit arranged by polymerization may have an acidic group. Here, in a case where the organic polymer has a plurality of acidic groups in one molecule, a denser dielectric layer is easily formed, and sufficient adhesiveness between the organic polymer and the dielectric layer is ensured. In addition, sufficient adhesiveness between the dielectric layer and the conductive polymer layer is ensured.

(3) Step of Forming Conductive Polymer Layer

Conductive polymer layer 4 may be formed by any method. For example, anode body 1 including dielectric layer 3 to which the organic polymer is attached is dipped into a solution containing a monomer as raw material of a conductive polymer, and conductive polymer layer 4 can be formed by a method such as chemical polymerization and electrolytic polymerization. Alternatively, anode body 1 is dipped into a solution in which the conductive polymer is dissolved or a dispersion in which the conductive polymer is dispersed, and thereafter, is dried, so as to form a coat of the conductive polymer on the surface of dielectric layer 3. In addition, conductive polymer layer 4 may be a laminated film of a plurality of conductive polymer layers.

Hereinafter, a case of forming a conductive polymer layer having a two-layer structure will be described as an example.

(3-1) Step of Forming First Conductive Polymer Layer

Anode body 1 having dielectric layer 3 to which the organic polymer is attached is dipped into a solution in which the first conductive polymer is dissolved, and after that, is dried. Accordingly, a dip film of the first conductive polymer is formed on the surface of dielectric layer 3 to which the organic polymer is attached. In addition, a first conductive polymer layer may be formed by applying a dispersion of the first conductive polymer onto dielectric layer 3 followed by drying. The concentration of the first conductive polymer in the solution or the dispersion may be 0.5 g/L (liters) to 6 g/L, for example.

A method for forming the first conductive polymer layer is not limited to a method of forming the dip film. For example, anode body 1 may be dipped into a solution containing a monomer as raw material of the first conductive polymer, and a dopant, and may be subjected to chemical polymerization.

(3-2) Step of Forming Second Conductive Polymer Layer

Next, anode body 1 having dielectric layer 3 on which the first conductive polymer layer is formed is dipped into a solution containing a monomer as raw material of a second conductive polymer, and a dopant, and is subjected to electrolytic polymerization. Accordingly, a second conductive polymer layer is formed on the surface of the first conductive polymer layer. The concentration of the monomer in the solution may be 0.1 mol/L (liter) to 2 mol/L, for example.

A method of forming the second conductive polymer layer is not limited to the electrolytic polymerization. For example, a solution or a dispersion of the second conductive polymer may be applied onto the first conductive polymer layer formed on the surface of dielectric layer 3 and may be dried.

The dopant used in the chemical polymerization and/or the electrolytic polymerization is not particularly limited, and for example, is a sulfonic acid-based metal salt. The sulfonic acid-based metal salt serves as an oxidant and a dopant. Examples of a portion configuring a sulfonic acid include an alkyl sulfonic acid (1-octane sulfonic acid and the like), an aromatic sulfonic acid (benzene sulfonic acid, toluene sulfonic acid, and the like), a polycyclic aromatic sulfonic acid (naphthalene disulfonic acid and the like), and a portion configuring a metal salt can be suitably selected from iron (III), copper (II), chromium (IV), zinc (II), and the like. One type of the material may be independently used, or two or more types thereof may be used in combination.

(4) Step of Forming Cathode Layer 5

A carbon paste and a silver paste are sequentially applied onto the surface of conductive polymer layer 4, and thus, cathode layer 5 formed of carbon layer 5a and silver paste layer 5b is formed. The thickness of carbon layer 5a may be from 1 μm to 20 μm, and the thickness of silver paste layer 5a may be from 50 μm to 100 μm, for example. The carbon paste is a composition containing a conductive carbon material such as graphite. The silver paste is a composition containing silver particles and a resin. The configuration of cathode layer 5 is not limited thereto, and cathode layer 5 may have a configuration having a current collecting function.

Second Exemplary Embodiment

In this embodiment, a treatment (Step B) by a second treatment liquid containing at least one selected from an inorganic acid and a low molecular carboxylic acid is performed in addition to the treatment (Step A) by the first treatment liquid containing the organic polymer, and thus, dielectric layer 3 is formed. Step B may be performed before or after Step A. In this embodiment, a case of performing Step B before Step A will be described. Hereinafter, differences from the first exemplary embodiment will be mainly described.

In Step B, anode body 1 is dipped into a chemical conversion tank filled with the second treatment liquid, and anode lead 2 is connected to an anode of the chemical conversion tank. Next, a current is allowed to flow between a cathode of the chemical conversion tank and anode body 1, and thus, anodization is performed. The inorganic acid or the low molecular carboxylic acid contained in the second treatment liquid is a low molecular compound. Accordingly, the second treatment liquid easily penetrates into the inside of anode body 1 which is a porous body. Therefore, the second treatment liquid acts even on the gap between the particles of the valve action metal in the inside of anode body 1. By Step B, dielectric layer 3 is easily formed over the entire of anode body 1 from the inside to the surface layer region.

(Second Treatment Liquid)

It is preferable that the second treatment liquid is an aqueous solution containing at least one of an inorganic acid and a low molecular carboxylic acid as an electrolyte. The concentration of the inorganic acid and/or the low molecular carboxylic acid contained in the second treatment liquid may be controlled such that the pH of the second treatment liquid is in a range greater than 0 and equal to or less than 5, for example. As the inorganic acid, phosphoric acid, nitric acid, acetic acid, and sulfuric acid can be used. As the low molecular carboxylic acid, formic acid, acetic acid, propionic acid, and the like can be used. More specifically, for example, it is preferable to use an aqueous solution of phosphoric acid having a concentration of 0.001 mass % to 10 mass %. It is preferable that the viscosity of the second treatment liquid is in a range from 0.1 mPa·s to 2 mPa·s, inclusive, at 25° C.

Next, similarly to the first exemplary embodiment, anode body 1 is anodized by using the first treatment liquid. At this time, the anodization may be performed for a short period of time compared to the anodization performed in the first exemplary embodiment. Accordingly, the anodization preferentially progresses on the surface layer region of anode body 1. Accordingly, a dense dielectric layer is additionally formed mainly on the surface layer region of anode body 1.

Figure 3:
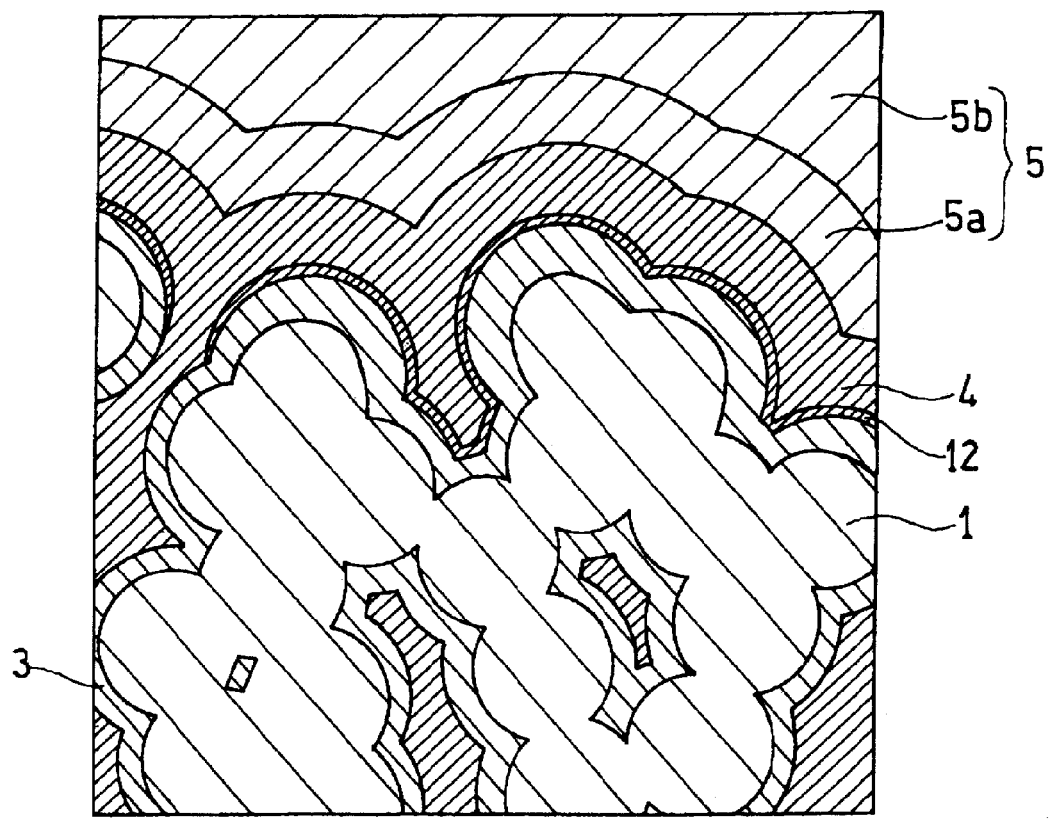
FIG. 3 is a sectional schematic view of a main part of another electrolytic capacitor according to the embodiment of the present disclosure.

According to this embodiment, as illustrated in FIG. 3, it is possible to make dielectric layer 3 thin on the surface of the fine pores of the inside of anode body 1, and thick on the surface layer region of anode body 1. Accordingly, the electrostatic capacitance is easily ensured. In addition, dielectric layer 3 can easily be dense and thick as being closer to the surface layer of anode body 1 where a defect easily occurs. Further, the organic polymer having an acidic group can be attached with high efficiency to dielectric layer 3 on the surface layer region of anode body 1 to which stress is easily applied from the outside. Accordingly, an increase in a leak current is considerably suppressed. On the other hand, as illustrated in FIG. 3, the organic polymer having an acidic group is rarely attached to the inside of dielectric layer 3, or the attachment amount is small. Accordingly, it is possible to reduce the use amount of the organic polymer, and it is possible to efficiently reinforce the surface layer region of anode body 1 by the small amount of the organic polymer.

In addition, the first treatment liquid contains the organic polymer, and thus, the viscosity is easily adjusted. By setting the viscosity of the first treatment liquid to be greater than that of the second treatment liquid, the organic polymer is easily attached to the region closer to the surface layer of anode body 1, and a dense dielectric layer is additionally and easily formed on the region closer to the surface. Accordingly, an effect of suppressing an increase in a leak current is increased, while suppressing a decrease in electrostatic capacitance.

Third Exemplary Embodiment

Also in this embodiment, the treatment (Step B) of the second treatment liquid containing at least one of an inorganic acid and a low molecular carboxylic acid is performed in addition to the treatment (Step A) of the first treatment liquid containing the organic polymer. Here, in this embodiment, Step A is performed before Step B. Hereinafter, differences from the first and second embodiments will be mainly described.

In Step A, similarly to the first exemplary embodiment, anode body 1 is anodized by using the first treatment liquid containing the organic polymer having an acidic group. Here, at this time, the anodization may be performed for a short period of time compared to the anodization performed in the first exemplary embodiment.

The organic polymer contained in the first treatment liquid is less likely to penetrate into the inside of anode body 1 which is a porous body, compared to the inorganic acid and the low molecular carboxylic acid. Here, the organic polymer easily acts on the gap between the particles of the valve action metal in the inside of anode body 1, compared to a case where the anodization of the second treatment liquid is performed in advance. Accordingly, dielectric layer 3 on the inside of anode body 1 easily becomes dense, and the organic polymer is easily attached to the surface of dielectric layer 3 in the inside of anode body 1, compared to the second exemplary embodiment. Accordingly, adhesiveness between dielectric layer 3 and the conductive polymer easily can be increased not only in the surface layer region of anode body 1 but also in the inside of anode body 1.

Next, similarly to the second exemplary embodiment, anode body 1 is anodized by using the second treatment liquid containing the inorganic acid and/or the low molecular carboxylic acid. At this time, the anodization further progresses over the surface layer region from the inside of anode body 1, and dielectric layer 3 is additionally formed over the entire of anode body 1. Accordingly, it is possible to reduce the area of the surface of anode body 1 on which dielectric layer 3 is not formed. In addition, the film quality of dielectric layer 3 is further improved.

Meanwhile, in the embodiments described above, a case where anode body 1 is a porous body formed of metal particles has been described, but the configuration of the anode body is not limited thereto. Anode body 1, for example, may be a metal foil or a metal plate of the valve action metal. In this case, it is preferable that etching pits are formed on the metal foil or the metal plate.

In addition, in the embodiments described above, a case where conductive polymer layer 4 has a two-layer structure including first conductive polymer layer 4a and second conductive polymer layer 4b has been described, but conductive polymer layer 4 may have a one-layer structure, or may have a three or more-layer structure.

Next, an electrolytic capacitor of the present disclosure will be described in more detail on the basis of examples. Here, the present disclosure is not limited by the following examples.

EXAMPLE 1

An electrolytic capacitor is prepared as described below, and the properties thereof are evaluated.

(1) Step of Forming Anode Body

Tantalum metal particles having a primary particle diameter of approximately 0.5 µm and a secondary particle diameter of approximately 100 µm are used as the valve action metal. The tantalum metal particles are molded into the shape of a rectangular parallelepiped such that first end portion 2a of anode lead 2 formed of tantalum is embedded in the tantalum metal particles, and after that, a molded body is sintered in vacuum. Accordingly, anode body 1 formed of tantalum porous sintered body is obtained. Anode body 1 has a rectangular parallelepiped shape of which the length is 4.4 mm, the width is 3.3 mm, and the thickness is 0.9 mm. Second end portion 2b of anode lead 2 is fixed onto one side surface (3.3 mm×0.9 mm) of anode body 1 in a state where second end portion 2b protrudes from the one side surface.

(2) Step of Forming Dielectric Layer

An aqueous solution containing a polyvinyl compound (a polymer A) having a phosphonic acid group is prepared as the first treatment liquid.

The viscosity of the first treatment liquid at 25° C. is measured by using a (spindle type) viscometer, and thus, is 0.1 Pa·s.

Anode body 1 and a part of anode lead 2 are dipped into the chemical conversion tank filled with the first treatment liquid, and second end portion 2b of anode lead 2 is connected to the anode of the chemical conversion tank. Then, the anodization is performed, and thus, as illustrated in FIG. 1, dielectric layer 3 of tantalum oxide ($Ta_2O_5$) is formed on the surface of anode body 1 and the surface of a part of anode lead 2. By the anodization, as illustrated in FIG. 2, dielectric layer 3 is formed on the surface (including the inner wall surface of the fine pore) of the porous body configuring anode body 1 and a part of anode lead 2.

The conditions of the anodization of the first treatment liquid are as follows.

Direct Current Voltage: 50 V
Current Density per Unit Weight of Anode Body: 1 mA
Oxidization Time: 1 hour Anode body 1 on which dielectric layer 3 is formed as described above is cut, and the sectional surface is observed by TOF-SIMS. At this time, it is observed that dense dielectric layer 3 is formed on the surface of anode body 1 and phosphorus derived from a phosphonic acid group is incorporated into the dielectric layer.

(3) Formation of Conductive Polymer Layer

Conductive polymer layer 4 formed of polypyrrole is formed on the surface of dielectric layer 3 by chemical polymerization.

(4) Formation of Cathode Layer 5

A carbon paste is applied onto the surface of conductive polymer layer 4, and thus, carbon layer 5a is formed. Next, a silver paste is applied onto the surface of carbon layer 5a, and thus, silver paste layer 5b is formed. Thus, cathode layer 5 configured of carbon layer 5a and silver paste layer 5b is formed.

As described above, an electrolytic capacitor of Example 1 is completed.

EXAMPLE 2

Anode body 1 prepared by the same method as in Example 1 is clipped into the chemical conversion tank filled with the second treatment liquid, and the anodization is performed, and thus, dielectric layer 3 of tantalum oxide ($Ta_2O_5$) is formed on the surface of anode body 1 and the surface of a part of anode lead 2.

An aqueous solution containing 1 mass % of phosphoric acid is prepared as the second treatment liquid. The pH of the second treatment liquid is from 0 to 1. In addition, the viscosity of the second treatment liquid at 25° C. is measured by using a (spindle type) viscometer, and thus, is 1 mPa·s.

The conditions of the anodization of the second treatment liquid are as follows.

Direct Current Voltage: 30 V
Current Density per Unit Weight of Anode Body: 1 mA
Oxidization Time: 3 hours Next, the anodization is further performed by using the first treatment liquid as in Example 1.

The conditions of the anodization of the first treatment liquid are as follows.

Direct Current Voltage: 50 V
Current Density per Unit Weight of Anode Body: 1 mA
Oxidization Time: 3 hours Except for the above, an electrolytic capacitor is prepared by the same method as in Example 1.

EXAMPLE 3

Anode body 1 prepared by the same method as in Example 1 is dipped into the chemical conversion tank filled with the first treatment liquid as in Example 1, and the anodization is performed, and thus, dielectric layer 3 of tantalum oxide ($Ta_2O_5$) is formed on the surface of anode body 1 and the surface of a part of anode lead 2.

The conditions of the anodization of the first treatment liquid are as follows.

Direct Current Voltage: 50 V
Current Density per Unit Weight of Anode Body: 1 mA
Oxidization Time: 1 hour Next, the anodization is further performed by using the second treatment liquid as in Example 2.

The conditions of the anodization of the second treatment liquid are as follows.

Direct Current Voltage: 50 V
Current Density per Unit Weight of Anode Body: 1 mA
Oxidization Time: 3 hours Except for the above, an electrolytic capacitor is prepared by the same method as in Example 1.

COMPARATIVE EXAMPLE 1

Anode body 1 prepared by the same method as in Example 1 is dipped into the chemical conversion tank filled with the second treatment liquid as in Example 2, and the anodization is performed, and thus, dielectric layer 3 of tantalum oxide ($Ta_2O_5$) is formed on the surface of anode body 1 and the surface of a part of anode lead 2. The anodization using the first treatment liquid is not performed.

The conditions of the anodization of the second treatment liquid are as follows.

Direct Current Voltage: 30 V
Current Density per Unit Weight of Anode Body: 1 mA
Oxidization Time: 3 hours Except for the above, an electrolytic capacitor is prepared by the same method as in Example 1.

Evaluation 250 of each electrolytic capacitor of Examples 1 to 3 and Comparative Example 1 are prepared, and a leak current is measured. Specifically, a voltage of 10 V is applied between anode body 1 and cathode 5, and the leak current is measured after 40 seconds. Then, quality is determined by comparing the measured value with a predetermined reference value, and a yield is obtained.

In Table 1, the measurement results are shown. In Table 1, the numerical value of Comparative Example 1 is set to 1, and the numerical values of Examples 1 to 3 are standardized with respect to that of Comparative Example 1.

TABLE 1

|  | Yield (Leak Current) |
| --- | --- |
| Example 1 | 1.08 |
| Example 2 | 1.20 |
| Example 3 | 1.10 |
| Comparative Example 1 | 1.00 |

From Table 1, each of Examples 1 to 3 has a high yield in the quality determination with respect to the reference value of the leak current, compared to Comparative Example 1. From the above description, it is confirmed that attachment of the organic polymer onto the surface of the dielectric layer allows the leak current to be reduced.

What is claimed is:

1. A manufacturing method of an electrolytic capacitor, the manufacturing method comprising steps of:
    preparing an anode body;
    forming a dielectric layer on the anode body; and
    disposing a cathode body such that the cathode body opposes the anode body via the dielectric layer, wherein:
    the step of forming the dielectric layer includes:
        step A of anodizing the anode body by bringing the anode body into contact with a first treatment liquid containing an organic polymer having one or more acidic groups;
        step B of anodizing the anode body by bringing the anode body into contact with a second treatment liquid containing at least one of an inorganic acid and a carboxylic acid having a molecular weight less than 1,000,
    the step A is performed after the step B, and
    a viscosity of the first treatment liquid is greater than a viscosity of the second treatment liquid.

2. The manufacturing method of an electrolytic capacitor according to claim 1,
    wherein the carboxylic acid having a molecular weight less than 1,000 is at least one of formic acid, acetic acid, and propionic acid.

3. The manufacturing method of an electrolytic capacitor according to claim 1,
    wherein the viscosity of the first treatment liquid is in a range from 0.05 Pa·s to 10 Pa·s, inclusive, at 25° C.

4. The manufacturing method of an electrolytic capacitor according to claim 1, wherein the second treatment liquid contains a carboxylic acid having a molecular weight less than 1,000.

5. An electrolytic capacitor, comprising:
    an anode body which is a porous body;
    a dielectric layer disposed on the anode body;
    a cathode body opposing the anode body via the dielectric layer; and
    an organic polymer disposed between the dielectric layer and the cathode body and attached to the dielectric layer, wherein:
    the organic polymer has one or more groups selected from an acidic group and residues of the acidic group, and
    an amount of the organic polymer which attaches on the dielectric layer at an apparent surface of the anode body is greater than an amount of the organic polymer which attaches on the dielectric layer in a region apart from the apparent surface of the anode body.

6. The electrolytic capacitor according to claim 5, wherein the acidic group is a phosphorus-containing oxo acid group.

7. The electrolytic capacitor according to claim 6, wherein the phosphorus-containing oxo acid group is a phosphonic acid group.

8. The electrolytic capacitor according to claim 5, wherein the organic polymer has a polyalkylene main chain and a side chain including at least one of the acidic group and the residues of the acidic group.

9. The electrolytic capacitor according to claim 5, wherein:
    the cathode body includes a conductive polymer layer disposed on the dielectric layer, and
    at least a part of the conductive polymer layer is attached to the organic polymer.

\* \* \* \* \*